Nov. 22, 1960     H. O. BENECKE     2,961,636
ELECTRO-ACOUSTIC TRANSDUCER FOR OMNIDIRECTIONAL SEARCH
Filed May 21, 1956
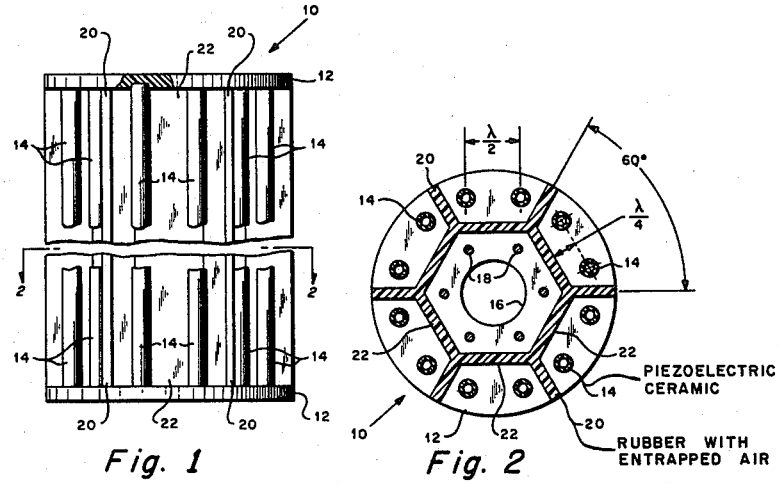
Fig. 1     Fig. 2
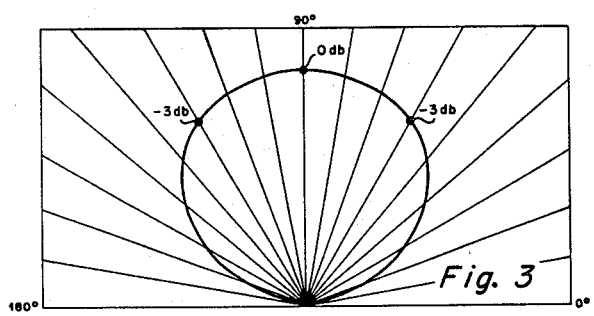
Fig. 3
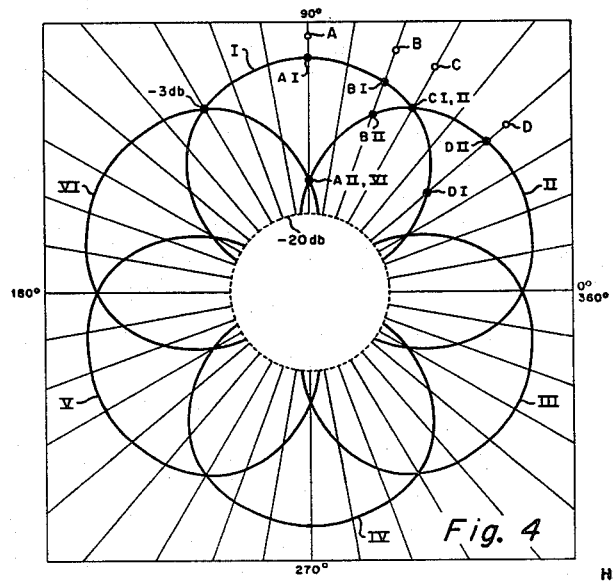
Fig. 4
INVENTOR
HEINRICH O. BENECKE
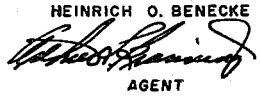
AGENT United States Patent Office 2,961,636
Patented Nov. 22, 1960

2,961,636

ELECTRO-ACOUSTIC TRANSDUCER FOR OMNIDIRECTIONAL SEARCH

Heinrich O. Benecke, Doylestown, Pa., assignor to the United States of America as represented by the Secretary of the Navy Filed May 21, 1956, Ser. No. 586,335

3 Claims. (Cl. 340—9)

(Granted under Title 35, U.S. Code (1952), sec. 266)

The invention described herein may be manufactured and used by or for the Government of the United States of America for governmental purposes without the payment of any royalties thereon or therefor.

This invention relates to transducers, and more particularly, it relates to transducers operative to transmit and receive sound impulses of a given frequency.

In the application of transducers to the detection and localization of underwater targets, such as submarines, by echo ranging techniques, a transducer construction is required which provides for omnidirectional search, concomitantly with the determination of the target range and bearing with high accuracy. An omnidirectional search comprises the detection of sound sources or sound reflecting objects from any direction normally disposed of a known axis. Detection and localization have been accomplished in the past by transducers such as the line transducer which is a stationary type operable to receive impulses continuously from a 360° area and the directional beam type transducer which is constructed to search only small arcs at a time and is rotated through the 360° arc in operation. A transducer of the directional beam type possesses a higher directivity index than a line transducer of the same length and hence has a longer range capability. But while it gives both range and approximate bearing, it searches only a narrow angle at a time and must be successively trained to a large number of different angular positions to cover 360° of azimuth. Such a technique requires a long hovering time even if no target is present, and improves the chance that contact with the target will be broken.

In contrast, the line transducer covers the full 360° at one time; repeated pings, which improve the detection range, are possible within a short hovering time. Because of the shorter hovering time the search rate is significantly greater with line transducers than with the directional beam type transducers. In addition, the line transducer gives only range, although localization can be achieved by subsequent dips and triangulation. Furthermore, a line transducer permits continuous contact with a target without loss of detection capability on any bearing inasmuch as a line transducer covers the target during the full dip time. However, a directional beam type transducer searching 360° covers the target only a small fraction of the total dip time, which improves a submarine's chances of breaking contact.

The present invention provides a transducer which combines the best features of both the omnidirectional and the directional type transducers. For this purpose there is provided in one embodiment a compact reflector structure, forming a plurality of circumferentially arranged sectors, each subtending a sector of search. Each of the sectors of search provides for a special arrangement of transducer elements having a particular relationship with the reflector walls to accomplish the purposes of this invention.

Therefore, it is a first object of this invention to provide a transducer which combines the advantages of both the omnidirectional and directional beam type transducers.

Another object of this invention is to provide transducers that continuously search a 360° area while stationary.

It is another object of this invention to provide stationary transducers for simultaneous searching of a 360° area having improved range, bearing accuracy, and search rate, and are compact and relatively simple in construction.

It is a further object of this invention to provide stationary transducers for simultaneous searching of a 360° area and are adaptable to a simple orientation system.

It has been found that the above and other objects are accomplished by a polygon shaped transducer in which the sides of the polygon constitute transmitting and receiving sectors in which means are provided for shielding the sectors from interfering sound waves and producing a smooth directional characteristic for each face.

The invention is best understood by reference to the following description taken in connection with the accompanying drawings which are hereby made a part of this specification and in which:

Fig. 1 is a side elevation view of a preferred form of the invention;

Fig. 2 is a section along 2—2 of Fig. 1;

Fig. 3 is a profile of the directional pattern characteristic of an individual sector in a plane normal to the transverse axis of the hexagonal transducer shown in Figs. 1 and 2.

Fig. 4 is a profile of a search pattern in a plane normal to the transverse axis of the hexagonal transducer illustrating the application of the preferred embodiment of the invention to echo ranging and searching of a moving target.

Referring to Figs. 1 and 2, transducer or hydrophone 10 consists of a pair of base plates 12 in which are embedded the ends of a plurality of parallel transducer elements 14 separating plates 12. Transducer elements 14 are hollow, cylindrical tubes and may consist of activated barium titanate-lead titanate ceramic, electroded on their inner and outer surfaces with silver, as is understood in the art.

Each of the plates 12 may also be provided with an access hole 16. A plurality of structural rods 18 embedded at their ends and joining together plates 12 will insure the necessary rigidity of transducer 10 as a unit.

Each pair of elements 14 illustrated in either Figs. 1 or 2 subtends a sector of search, and is separated from the next pair of elements by a reflector sidewall 20 extending the whole length of the device. Side walls 20 are connected integrally along their inner edges to back reflector walls 22, and in fact, the side and back reflector walls may be a unitary structure, as is illustrated. As is understood in the art, the reflector walls would be made of a material having a specific impedance much less than that of water. For example, rubber with entrapped air enclosures would be suitable.

As seen in Fig. 2, in each of the sectors, elements 14 are separated by one-half the wavelength ($\lambda/2$) of the operating frequency, and the plane parallel to wall 22 including both elements 14 of the searchlight is one quarter wavelength ($\lambda/4$) from the facing surface of wall 22.

Each pair of transducer elements 14 subtending a sector of search is connected in reception to one of six separate channels (not shown), as is understood in the art. In the hexagonal arrangement of Figs. 1 and 2, six pairs of transducer elements are utilized, each one designed to span 60° of the horizon. The device is adaptable for use with conventional receiving, transmitting and evaluating apparatus used in searching for underwater targets from the air.

Figs. 3 and 4 illustrate the operation of the hexagonal transducer described above. In Fig. 3, the directional pattern characteristic output of a pair of transducer elements is shown. Taking into account the effect of the reflector walls 20 and 22, output U as a function of azimuth angle $\theta$ of a single pair of transducer elements is given as follows:

$$U = \cos\left(\frac{\pi}{2}\sin\theta\right)\sin\left(\frac{\pi}{2}\cos\theta\right)$$

For each of the sectors of search, the 3 db down angle is 60°, so that the six pairs of elements shown are required for simultaneous 360° coverage to maintain response above this level. Fig. 4 shows a horizontal pattern of transducer 10 combining the responses of all six searchlights with parts more than 20 db below maximum within the broken line circle not shown.

When a target is picked up by transducer 10, the indication is given on two or three of the six receiving channels. For example, if the searchlights are designated I, II, III, IV, V and VI, respectively, a submarine at B, C, or D will give an indication on two as determined by drawing a line from each target to the origin and noting which characteristic curves are intercepted, while a submarine at A will give indications on three instruments. In the latter case, incidentally, only the two stronger indications need be used. The strongest signal shows the particular 60° segment in which the target is located; the signal in an adjacent search sector indicates that the target lies off the axis of the sectors. The angle of the target with respect to the main axis follows as a funcion of the difference in db between the two indications. It has been found that this function is almost linear, with a slope of about two degrees per db difference. If the difference can be read with an accuracy within ±½ db, the bearing is obtained with an error of ±1 degree, which is highly superior to other methods. If the background level is low enough, and three transducers give a response, the difference between the two lower levels gives an even greater accuracy, for example, ±0.25 degree.

Errors not due to the method of echo observation, but for instance due to the compass, must of course, be treated separately.

It is understood that polygon shapes other than hexagons may be used. The number of sides of the polygon used has a bearing on directionality, range, and operating frequency, and as a practical matter, at least three should be used. The upper limit on the number of sides possible is only where the monitoring becomes cumbersome.

Calculations made for other polygon shapes of the invention show that they may have certain distinct advantages. For example, the triangular transducer having one line element in front of each side for an angle of 120° has the advantage of small horizontal dimensions for a given frequency due to the low number of sides. Even number side devices have a particularly favorable rigidity while preserving the favorable aspects of a polygon.

Another modification would be in the eight-sided transducer where every second line element would be opposite a corner of the polygon. All sixteen outputs can be taken to the monitoring aircraft separately, and there combined to eight groups of three, each corner element appearing twice. Each group of three may then be heavily shaded to obtain approximately the necessary angle of 45°. This transducer design gives good results at 8.9 kc.

It is seen from the above description that transducer constructions have been provided for continuous search of a 360° angle while in the stationary position and having improved bearing accuracy, search rate, and range. The transducers disclosed are compact and simple in construction, and adaptable to simple orientation systems. As a result, a much shorter hovering time of the monitoring aircraft is required in using the present invention.

While the application of the invention has been illustrated as a transmitting and receiving device for echo ranging, it may obviously be used as a listening device only. Its application is likewise not limited to search for underwater targets as it may obviously be used in many other acoustic applications, such as, for example, navigation and mapping.

Obviously, many modifications and variations of the present invention are possible in the light of the above teachings. It is, therefore, to be understood that within the scope of the appended claims the invention may be practiced otherwise than as specifically described.

What is claimed is:

1. In an electro-acoustic transducer, a plurality of parallel, circumferentially arranged piezo-electric elements operably disposed in pairs, each pair of said elements subtending a sector of search and collectively providing for omnidirectional search, the elements of each pair being spaced from each other by one-half the wave length at the operating frequency, and a reflector wall for each sector parallel to the plane containing both elements subtending a sector of search and spaced radially inwardly one-quarter wave length at the operating frequency.

2. In an electro-acoustic transducer, a plurality of substantially parallelly extending circumferentially arranged elongated piezo-electric elements operably disposed in pairs, each pair of said elements subtending a sector of search and collectively providing for omnidirectional search, the elements of each pair being spaced on centers substantially one-half wavelength apart at the operating frequency, and reflector means substantially isolating each pair of said elements from the others and operably disposed to subtend each of the sectors of search.

3. In combination, a plurality of substantially parallelly extending elongated piezo-electric transducer devices circumferentially arranged to provide omnidirectional search, and a corresponding plurality of reflector means shaped to substantially minimize interaction between each of the transducer devices and spaced radially inwardly a quarter wavelength at the operating frequency from each of said transducer devices so that each of the reflector means operatively associated with its respective transducer device is subtending a sector of search, whereby the direction of an acoustical impulse incident upon said transducer devices is a function of the relative magnitude of signal developed in each of said transducer devices.

References Cited in the file of this patent

UNITED STATES PATENTS

| | | |
|---|---|---|
| 2,216,084 | Libson | Sept. 24, 1940 |
| 2,313,513 | Brown | Mar. 9, 1943 |
| 2,407,661 | Harrison | Sept. 17, 1946 |
| 2,438,936 | Mason | Apr. 6, 1948 |
| 2,468,837 | Peek | May 3, 1949 |
| 2,511,689 | Beechlyn | June 13, 1950 |
| 2,580,462 | Ranger | Jan. 1, 1952 |
| 2,746,026 | Camp | May 15, 1956 |
| 2,789,382 | Fruengel | Apr. 23, 1957 |
| 2,839,673 | Wilcoxon | June 17, 1958 |